United States Patent
Ferenz et al.

(10) Patent No.: US 9,334,354 B2
(45) Date of Patent: May 10, 2016

(54) MODIFIED ALKOXYLATION PRODUCTS WHICH HAVE ALKOXYSILYL GROUPS AND CONTAIN URETHANE GROUPS, AND THEIR USE

(71) Applicant: EVONIK INDUSTRIES AG, Essen (DE)

(72) Inventors: Michael Ferenz, Essen (DE); Matthias Lobert, Essen (DE); Frank Schubert, Neunkirchen-Vluynr (DE); Anke Lewin, Dusseldorf (DE); Volker Zellmer, Bottrop (DE); Wilfried Knott, Essen (DE); Melanie Roessing, Oberhausen (DE)

(73) Assignee: Evonik DeGussa GMBH, Essen (DE)

( * ) Notice: Subject to any disclaimer, the term of this patent is extended or adjusted under 35 U.S.C. 154(b) by 12 days.

(21) Appl. No.: 14/332,838

(22) Filed: Jul. 16, 2014

(65) Prior Publication Data

US 2015/0057369 A1    Feb. 26, 2015

(30) Foreign Application Priority Data

Aug. 23, 2013 (DE) .......................... 10 2013 216 751

(51) Int. Cl.
| | | |
|---|---|---|
| *C07F 7/10* | (2006.01) | |
| *C08G 18/38* | (2006.01) | |
| *C08G 18/50* | (2006.01) | |
| *C08G 65/22* | (2006.01) | |
| *C08G 65/333* | (2006.01) | |
| *C08G 65/336* | (2006.01) | |
| *C08G 18/70* | (2006.01) | |
| *C08J 9/00* | (2006.01) | |
| *C09D 175/08* | (2006.01) | |
| *C09J 175/08* | (2006.01) | |
| *C08G 18/75* | (2006.01) | |
| *C08G 18/48* | (2006.01) | |
| *C09J 175/04* | (2006.01) | |
| *C08G 101/00* | (2006.01) | |

(52) U.S. Cl.
CPC ............ *C08G 18/3893* (2013.01); *C08G 18/48* (2013.01); *C08G 18/5096* (2013.01); *C08G 18/70* (2013.01); *C08G 18/755* (2013.01); *C08G 65/22* (2013.01); *C08G 65/336* (2013.01); *C08G 65/33303* (2013.01); *C08J 9/00* (2013.01); *C09D 175/08* (2013.01); *C09J 175/04* (2013.01); *C09J 175/08* (2013.01); *C08G 2101/00* (2013.01); *C08J 2375/08* (2013.01); *C09J 2475/00* (2013.01)

(58) Field of Classification Search
CPC .......................... C08G 18/3983; C09D 175/08
USPC ....................................................... 556/414
See application file for complete search history.

(56) References Cited

U.S. PATENT DOCUMENTS

| | | | |
|---|---|---|---|
| 3,278,457 | A | 10/1966 | Milgrom |
| 3,278,458 | A | 10/1966 | Belner |
| 3,278,459 | A | 10/1966 | Herold |
| 3,427,256 | A | 2/1969 | Milgrom |
| 3,427,334 | A | 2/1969 | Belner |
| 3,427,335 | A | 2/1969 | Herold |
| 5,470,813 | A | 11/1995 | Le-Khac |
| 5,482,908 | A | 1/1996 | Le-Khac |
| 5,777,177 | A | 7/1998 | Pazos |
| 5,981,812 | A | 11/1999 | Eufinger et al. |
| 6,756,465 | B1 * | 6/2004 | Jacobine ................. C08G 18/10 106/287.11 |
| 7,605,284 | B2 | 10/2009 | Brueckner et al. |
| 7,834,122 | B2 | 11/2010 | Ferenz et al. |
| 8,030,366 | B2 | 10/2011 | Ferenz et al. |
| 8,058,388 | B2 | 11/2011 | Sellmann et al. |
| 8,247,525 | B2 | 8/2012 | Schubert et al. |
| 8,268,939 | B2 | 9/2012 | Ebbrecht et al. |
| 8,283,422 | B2 | 10/2012 | Schubert et al. |
| 8,309,664 | B2 | 11/2012 | Knott et al. |
| 8,309,673 | B2 | 11/2012 | Schubert et al. |
| 8,324,325 | B2 | 12/2012 | Knott et al. |
| 8,334,355 | B2 | 12/2012 | Henning et al. |
| 8,349,907 | B2 | 1/2013 | Henning et al. |
| 8,420,567 | B1 | 4/2013 | Naumann et al. |
| 8,450,514 | B2 | 5/2013 | Schubert et al. |
| 8,476,189 | B1 | 7/2013 | Naumann et al. |
| 8,617,529 | B2 | 12/2013 | Herrwerth et al. |
| 8,623,984 | B2 | 1/2014 | Henning et al. |
| 8,729,207 | B2 | 5/2014 | Hartung et al. |
| 8,772,423 | B2 | 7/2014 | de Gans et al. |
| 8,779,079 | B2 | 7/2014 | Henning et al. |
| 2007/0059539 | A1 | 3/2007 | Doehler et al. |
| 2007/0128143 | A1 | 6/2007 | Gruning et al. |

(Continued)

FOREIGN PATENT DOCUMENTS

| | | |
|---|---|---|
| DE | 69831518 | 6/2006 |
| DE | 10 2006 054155 | 5/2008 |

(Continued)

OTHER PUBLICATIONS

"Dictionary of Natural Products", Chapman and Hall/CRC Press, Taylor and Francis Group, online version from 2011: <http://dnp.chemnetbase.com/>.

*Primary Examiner* — Porfirio Nazario Gonzalez
*Assistant Examiner* — Kofi Adzamli
(74) *Attorney, Agent, or Firm* — Frommer Lawrence & Haug LLP

(57) ABSTRACT

The invention relates to alkoxylation products, their preparation, compositions comprising the alkoxylation products of the invention, and the use thereof as or for producing adhesives and sealants.

17 Claims, No Drawings

(56) References Cited

U.S. PATENT DOCUMENTS

| | | |
|---|---|---|
| 2009/0137752 A1 | 5/2009 | Knott et al. |
| 2010/0036011 A1 | 2/2010 | De Gans et al. |
| 2010/0071849 A1 | 3/2010 | Knott et al. |
| 2010/0081781 A1 | 4/2010 | Schubert et al. |
| 2010/0210445 A1 | 8/2010 | von Rymon Lipinski et al. |
| 2010/0248325 A1 | 9/2010 | Eckstein et al. |
| 2010/0266518 A1 | 10/2010 | Springer et al. |
| 2011/0042004 A1 | 2/2011 | Schubert et al. |
| 2011/0046305 A1 | 2/2011 | Schubert et al. |
| 2011/0301254 A1 | 12/2011 | Knott et al. |
| 2012/0028022 A1 | 2/2012 | Brugger et al. |
| 2012/0029090 A1 | 2/2012 | Brugger et al. |
| 2012/0037036 A1 | 2/2012 | Veit et al. |
| 2012/0067520 A1 | 3/2012 | Schubert et al. |
| 2012/0068110 A1 | 3/2012 | Schubert et al. |
| 2012/0168664 A1 | 7/2012 | Maurer et al. |
| 2012/0190760 A1 | 7/2012 | Henning et al. |
| 2012/0296125 A1 | 11/2012 | Schubert et al. |
| 2012/0308494 A1 | 12/2012 | Schubert et al. |
| 2013/0035407 A1 | 2/2013 | Lobert et al. |
| 2013/0035408 A1 | 2/2013 | Knott et al. |
| 2013/0035409 A1 | 2/2013 | Hubel et al. |
| 2013/0041102 A1 | 2/2013 | Albrecht et al. |
| 2013/0041115 A1 | 2/2013 | Knott et al. |
| 2013/0190414 A1 | 7/2013 | Terheiden et al. |
| 2013/0237616 A1 | 9/2013 | Ferenz et al. |
| 2013/0245304 A1 | 9/2013 | Schubert et al. |
| 2013/0267403 A1 | 10/2013 | von Rymon Lipinski et al. |
| 2013/0345318 A1 | 12/2013 | Schubert et al. |
| 2014/0179894 A1 | 6/2014 | Lobert et al. |

FOREIGN PATENT DOCUMENTS

| | | |
|---|---|---|
| DE | 10 2010 038774 | 2/2012 |
| EP | 0 981 407 | 3/2000 |
| EP | 1 017 738 | 7/2000 |
| EP | 1 474 464 | 11/2004 |
| EP | 2 093 244 | 8/2009 |
| EP | 2415796 A1 | 2/2012 |
| EP | 24157537 A1 | 2/2012 |
| JP | 07062222 | 3/1995 |
| JP | 09012861 | 1/1997 |
| JP | 09012863 | 1/1997 |
| WO | WO-98/52689 | 11/1998 |
| WO | WO-9914258 | 3/1999 |
| WO | WO-03066706 | 8/2003 |
| WO | WO-2005/003201 A2 | 1/2005 |
| WO | WO-2005/100482 A1 | 10/2005 |
| WO | WO-2006/002807 A1 | 1/2006 |
| WO | WO-2012130674 A2 | 10/2012 |

* cited by examiner

MODIFIED ALKOXYLATION PRODUCTS WHICH HAVE ALKOXYSILYL GROUPS AND CONTAIN URETHANE GROUPS, AND THEIR USE

The present application claims priority from German Patent Application No. DE 10 2013 216 751.2 filed on Aug. 23, 2013, the disclosure of which is incorporated herein by reference in its entirety.

FIELD OF THE INVENTION

The invention relates to alkoxylation products, their preparation, compositions comprising the alkoxylation products of the invention, and the use thereof as or for producing adhesives and sealants.

Conventional polyether alcohols, often also referred to simply for short as polyethers and composed chiefly of propylene oxide and ethylene oxide, are well established and are produced industrially in large quantities. Among other applications, they serve, through reaction with polyisocyanates as starting compounds for producing polyurethanes, or else for producing surfactants.

Organic alkoxysilane compounds such as 3-glycidyloxypropyl-trimethoxysilane or triethoxysilane, which are available, for example, under the trade names DYNASYLAN® GLYMO and DYNASYLAN® GLYEO (trade marks of Evonik Degussa GmbH) respectively, enter into the production of organically modified networks in the context of the sol-gel process, which serves as a key operation in the production of nanocomposites that provide coating systems having enhanced properties in respect of hardness, scratch and abrasion resistance, temperature resistance, and also solvent and acid resistance. Alkoxysilane compounds, moreover, are employed diversely in sealants and adhesives and also, generally, as reactive adhesion promoters and primers for various substrates such as metals, glass and glass fibres/glass fabrics for fibre-reinforced composite materials and for the surface treatment of, for example, pigments and fillers in coating materials.

There has been no lack of efforts made to improve the profiles of properties of alkoxysilane compounds by means of chemical modifications, in order to open up even further fields of application to this significant product class. For instance, it is known from the literature that the profile of properties of alkoxylation products (polyethers) can be combined with those of crosslinkable compounds carrying alkoxysilyl groups especially. For instance, DE 69831518 T2 is directed inter alia to the modification of polyether alcohols with, for example, alkoxysilanes which carry isocyanate groups, with urethanizing linkage. Additionally selected for alkoxysilyl modification is the hydrosilylating attachment of alkoxymonohydridosilanes onto polyetherols that have been modified beforehand with olefinically unsaturated end groups.

Specifications JP 09012863, JP 09012861 and JP 07062222 claim a process for producing polyetherols equipped exclusively terminally with hydrolysable trialkoxysilyl functions, such as glycerol polyetherols, for example, which are first prepared via DMC catalysis and are then converted, by addition of alkali metal alkoxide and allyl chloride, into the corresponding allyl ethers, and subsequently, by platinum metal-catalysed hydrosilylation, into the alkoxysilyl-terminated target products.

All of the processes described in the prior art are therefore suitable only for the preparation of polyalkoxylene compounds modified exclusively terminally with trialkoxysilyl groups, and not for the single and/or multiple modification of polyether chains with trialkoxy functions within the sequence of oxyalkylene units as well.

According to EP 2 093 244, it was possible for the first time to prepare alkoxylation products which carry alkoxysilyl groups and are notable for the fact that, in contrast to the prior art known until that date, the alkoxysilyl groups are distributed randomly or in blocks along the polyether chain, and are not just located at the termini of the chain. These compounds, furthermore, are notable for a terminal OH group, which is a consequence of the reaction.

The presence of the OH group and the hydrolysis-sensitive alkoxysilyl groups in one molecule are the basis for the intrinsic reactivity of the compounds and ready crosslinkability with formation of three-dimensional polymeric networks. Experiments, however, have also shown that the reactivity of the OH group may be too high.

DE 10 2010 038774 describes non-hydroxylated polymers which contain alkoxysilyl groups and which consist of polyether blocks and urethane units. The breaking stress of the process products is inadequate.

It is noted that citation or identification of any document in this application is not an admission that such document is available as prior art to the present invention.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

It is an object of the present specification, therefore, to provide compounds which, after they have cured, exhibit an increased breaking stress relative to alkoxysilyl-containing polymers of the prior art.

A further object was to provide compounds which endow curable compositions with good storage stability.

SUMMARY OF THE INVENTION

Surprisingly it has been found that compounds containing the reaction products with polyfunctional isocyanates as defined below achieve these objects.

The present invention therefore provides alkoxylation products as described in the claims and in the description hereinafter.

The present invention additionally provides a process for preparing alkoxylation products of the invention. In a preferred process, in a first reaction step (a), polyethers $(HD^A)_t D^X$ are reacted with diisocyanates, and in a second reaction step (b), the product and/or the product mixture of the first reaction step (a) are reacted with a molecule of the formula H-M. Polyethers $(HD^A)_t D^X$, diisocyanates and molecules of the formula H-M are defined hereinafter. H stands for hydrogen.

Likewise provided for the present invention are compositions comprising at least one of the alkoxylation products of the invention, alone or in mixtures with further, optionally curable substances.

The present invention further provides for the use of the alkoxylation products of the invention, and also of the products of the process of the invention, and also of the compositions of the invention comprising the alkoxylation products of the invention.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

One advantage of the invention is that the alkoxylation products of the invention, and also products of the process of the invention, have excellent storage stability. It is likewise advantageous that the compositions of the invention comprising the alkoxylation products of the invention, and also products of the process of the invention, are outstandingly storage-stable in the absence of water and/or moisture following addition of a curing catalyst.

Another advantage of the invention is that the alkoxylation products of the invention, and also products of the process of the invention, do not emit any toxic substances.

The alkoxylation products of the invention, the products of the process of the invention, the processes of the invention for preparing the compositions, and also the inventive use thereof, are described by way of example hereinbelow, without any intention that the invention should be confined to these exemplary embodiments. When ranges, general formulae or compound classes are specified hereinafter, these shall include not just the corresponding ranges or groups of compounds that are explicitly mentioned but also all sub-ranges and sub-groups of compounds which can be obtained by removing individual values (ranges) or compounds. Where documents are cited in the context of the present description, it is intended that their content fully form part of the disclosure content of the present invention. Where content figures (ppm or %) are given below or above, they are, unless otherwise indicated, figures in % by weight or ppm by weight (wppm). In the case of compositions, the content figures, unless otherwise indicated, are based on the overall composition. Where average values are reported below, the values in question are numerical averages unless otherwise specified. Where molar masses are used, they are, unless expressly noted otherwise, weight-average molar masses Mw with the unit g/mol. Where measurement values are indicated below, these measurement values, unless otherwise indicated, have been ascertained at a pressure of 1013.25 hPa and at a temperature of 25° C.

The definitions below in some cases include further terms, which are used equivalently and synonymously with the term defined.

The word fragment "poly" in connection with this invention encompasses not only exclusively compounds having at least 3 repeating units of one or more monomers in the molecule, but also, more particularly, those compositions of compounds which exhibit a molecular weight distribution and possess an average molecular weight of at least 200 g/mol. This definition accounts for the circumstance that within the field of art in question it is common to identify such compounds as polymers even when they do not yet appear to satisfy the definition of a polymer as per OECD or REACH guidelines.

Wherever molecules or molecular fragments have one or more stereocentres or can be differentiated into isomers on the basis of symmetries, or on the basis of other effects, such as restricted rotation, for example, all of the possible isomers are included by the present invention.

Isomers are known to the skilled person; the reader is referred particularly to the definitions given by Professor Kazmaier of the Saarland University, e.g. http://www.uni-saarland.de/fak8/kazmaier/PDF_files/vorlesungen/Stereochemie%20Strassb%20Vorlage.pdf.

Where reference is made within this invention to natural substances, such as lactate, for example, the intention in principle is to refer to all isomers, preferably those which occur naturally in each case, and hence, in the instance cited here, L-lactate.

As regards the definition of natural substances, reference is made to the scope of the "Dictionary of Natural Products", Chapman and Hall/CRC Press, Taylor and Francis Group, e.g. in the online version from 2011: http://dnp.chemnetbase.com/.

The various fragments in the formulae (Ia) and (II) below may be distributed statistically. Statistical distributions may have a blockwise construction with an arbitrary number of blocks and an arbitrary sequence, or may be subject to a randomized distribution; they may also be constructed in alternation or else may form a gradient over the chain; in particular they may also form all hybrid forms in which, optionally, groups with different distributions may follow one another. The formulae (I), (Ia) and (II) describe polymers which have a molar weight distribution. The indices therefore represent the numerical average over all of the monomer units.

The indices a, b, c, d, e, f, g, h, i, j, k, l, m, n, o, p, q, r, s, t, u and v that are used in the formulae, and also the value ranges for the specified indices, may be understood as average values of the possible statistical distribution of the structures and/or mixtures thereof that are actually present. This applies even to those structural formulae which as such, per se, are reproduced exactly, such as for formula (Ia) and (II), for example.

The alkoxylation products of the invention which comprise the structural elements of the formula (I)

$$M_i D_j T_k Q_l UR_u AP_v \qquad \text{formula (I)}$$

are distinguished by the fact that the fragments M, D, T and Q are linked not to one another but instead with one another via the groups UR and/or AP, and the groups UR and AP are not linked to one another but instead, accordingly, are linked with one another via the fragments D, T or Q.

With regard to the indices, i=1 to 16, preferably 2 to 14, more preferably greater than 2 to 12, j=0 to 10, preferably 0.5 to 8, more preferably 1 to 6, very preferably 1.2 to 4, preferably also greater than or equal to 2, k=0 to 6, preferably greater than 0 to 4, more particularly 0.5 to 2, l=0 to 4, preferably greater than 0 to 3, more particularly 0.5 to 2, preferably j+k is greater than 0, more particularly j+k is greater than or equal to 1, especially preferably j+k is greater than or equal to 2, u=1 to 17, preferably 1 to 15, more preferably greater than or equal to 2 to 112, more preferably 2.5 to 10, and especially preferably 3 to 8, v=0 to 6, preferably greater than 0 to 4, more particularly 0.1 to 2.

M radicals are independently of one another identical or different radicals from the following group:

a)

  (formula IVa)

b)

  (formula IVb)

c)

  and d)

formula (Ia)

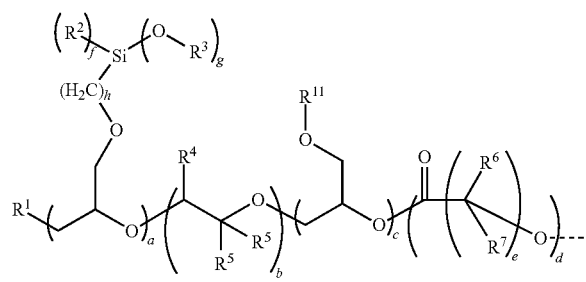

with the proviso that at least 10 mol % of the radicals M, based on the total amount of the radicals M, are —NH—$R^{12}$ of the formula IVa and/or —$NR^{12}_2$ of the formula IVb. Preferably at least 25 mol % of the radicals M, based on the total amount of the radicals M, are —NH—$R^{12}$ and/or —$NR^{12}_2$; especially preferably at least 51 mol % of the radicals M, based on the total amount of the radicals M, are —NH—$R^{12}$ and/or —$NR^{12}_2$, where, for the formulae IVa, IVb and IVc:

$R^{12}$ radicals in the formulae IVa, IVb and IVc are independently of one another identical or different, optionally substituted hydrocarbon radicals which are interrupted by heteroatoms, or optionally substituted hydrocarbon radicals having 1 to 30 C atoms, preferably selected from alkyl, alkylene, aryl and/or alkaryl radicals, preferably having 1 to 18, especially preferably having 1 to 12, C atoms.

Preference is given to $R^{12}$ as hydrocarbon radicals having 1 to 18 C atoms or hydrocarbon radicals which are interrupted by heteroatoms, of the general formula:

$$C_oH_{2o+1}-(OC_mH_{2m})_n-(OCH_2CH_2)_p-(OCH_2CH(CH_3))_r-,$$

where m=3 to 12, n=0 to 50, o=1 to 36, preferably 2 to 20, more preferably 3 to 16, for example also 5 to 16 or 8 to 11, especially preferably 4 to 12, p=0 to 50, preferably greater than 0 to 30, more preferably 1 to 20, and especially preferably 0 to 10, r=1 to 40, preferably 3 to 30, more particularly 4 to 20; radicals of the formula IVa, b and/or c are with particular preference a hydrocarbon radical of the formula

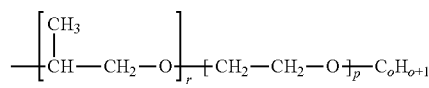

where o, p and r as defined above, and more preferably the hydrocarbon radical is a polyether consisting of polypropylene oxide prepared starting from butanol; very preferably $R^{12}$ is a polypropylene oxide of the formula $C_4H_9O[CH_2CH(CH_3)O]_{3\ to\ 10}$, especially preferably of the formula $C_4H_9O[CH_2CH(CH_3)O]_{5\ to\ 6}$.

Particularly preferred are the radicals with M being of formulae (IVa) or (IVb), selected from the radicals of the following amines, which in the form listed correspond to the formula H-M, i.e. H—NH—$R^{12}$ as per formula (IVa) or H—$NR^{12}_2$ as per formula (IVb): ethylamine, diethylamine, propylamine, dipropylamine, butylamine, dibutylamine, dicyclohexylamine, dihexylamine, 2-ethylhexylamine, di-2-(ethylhexyl)amine, ditridecylamine, aniline, 1-phenylethylamine, 2,6-xylidene, 2-phenylethylamine, benzylamine, toluidine, 2-methoxyethylamine, 3-methoxypropylamine, di-(2-methoxyethyl)amine, 2-(diethylamino)ethylamine, 3-(dimethylamino)-1-propylamine, bis[(3-dimethylamino)propyl]amine, N-(3-aminopropyl)imidazole or isomers thereof and polyetheramines, which are sold under the name Jeffamin, for example, such as Jeffamin® M 2070, for example.

Particularly preferred are the radicals with M being of formula (IVc), selected from the radicals of the following alcohols, which in the form listed correspond to the formula H-M, i.e. H—$OR^{12}$ as per formulae (IVc): allyl alcohol, 2-allyloxyethanol, vinyl alcohol, ethanol, and also all isomers of propanol, of butanol, of pentanol, of hexanol, of heptanol, of octanol and of nonanol, and also capryl alcohol, 1-undecanol, lauryl alcohol, 1-tridecanol, isotridecyl alcohol, myristyl alcohol, 1-pentadecanol, cetyl alcohol, palmoleyl alcohol, 1-heptadecanol, stearyl alcohol, isostearyl alcohol, oleyl alcohol, elaidyl alcohol, petroselinyl alcohol, linolyl alcohol, linolenyl alcohol, 1-nonadecanol, elaeostearyl alcohol, arachyl alcohol, 1-heneicosanol, gadoleyl alcohol, behenyl alcohol, erucyl alcohol and brassidyl alcohol, and also their technical mixtures, the compound class of the oxo-process alcohols, which usually carry 2 to 4 methyl groups as branches, so-called Guerbet alcohols, which are branched with an alkyl group in position 2, examples being 2-ethylhexanol, 2-butyloctanol, 2-hexyldecanol and/or 2-octyldodecanol, additionally cyclopentanol, 1-methylcyclopentanol, cyclohexanol, furfuryl alcohol, solketal, and also any mono-OH-terminal polyethers and/or polyalkylene oxides such as, for example, methyl- or butyl-started polyethylene oxides or polypropylene oxides, and/or their mixed oxides. Particularly preferred for use are butanol, 2-ethylhexanol, nonanol, isononanol, 3,5,5-trimethylhexanol, decanol and isotridecyl alcohol, or a polyether consisting of polypropylene oxide, prepared starting from butanol; more preferably M corresponds to $C_4H_9O[CH_2CH(CH_3)O]_{3\ to\ 8}$, especially preferably M corresponds to $C_4H_9O[CH_2CH(CH_3)O]_{5\ to\ 6}—$, and where, for the formulae (Ia):

a=0 to 1000, preferably greater than 0 to 100, more preferably 1 to 50, especially preferably 0 to 5, b=0 to 1000, preferably 1 to 800, more preferably 2 to 500, especially preferably 3 to 400,
c=0 to 1000, preferably greater than 0 to 100, more preferably 1 to 50, especially preferably 0 to 5, more particularly 0,
d=0 to 1000, preferably greater than 0 to 100, more preferably 1 to 50, especially preferably 0 to 5, more particularly 0,
with the proviso that the groups with the indices a, b, c and d are freely permutable over the molecular chain,
e=1 to 10,
g+f=3 and g is at least 1,
h=0 to 10, preferably 1 to 10, especially 3
and with the proviso that the various monomer units both of the fragments with the indices a, b, c and d and, optionally, of the polyoxyalkylene chain of the substituent $R^1$ may be constructed in blocks with one another or else are subject to a statistical distribution and, furthermore, are freely permutable with one another,
and where
$R^1$=independently at each occurrence a saturated or unsaturated, linear or branched organic hydrocarbon radical which may contain O, S and/or N as heteroatoms, preferably having 4 to 400 C atoms, more preferably a hydrocarbon radical which is interrupted by heteroatoms, of the general formula:

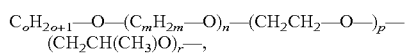

$C_oH_{2o+1}—O—(C_mH_{2m}—O)_n—(CH_2CH_2—O—)_p—(CH_2CH(CH_3)O)_r—$, where
m=3 to 12,
n=0 to 50,
=1 to 36, preferably 2 to 20, more preferably 3 to 16, for example also 5 to 16 or 8 to 11, especially preferably 4 to 12,
p=0 to 50, preferably greater than 0 to 30, more preferably 1 to 20, and especially preferably 0 to 10,
r=1 to 40, preferably 3 to 30, more particularly 4 to 20,
$R^2$=independently at each occurrence an alkyl group having 1 to 8 carbon atoms, more particularly methyl or ethyl,
$R^3$=independently at each occurrence an alkyl group having 1 to 8 carbon atoms, more particularly methyl, ethyl, propyl, isopropyl,
$R^4$=independently at each occurrence a hydrogen radical or an alkyl group having 1 to 8 carbon atoms, preferably hydrogen, methyl or ethyl, especially preferably hydrogen,
$R^5$=independently at each occurrence a hydrogen radical, an alkyl group having 1 to carbon atoms, or an aryl or alkaryl group, preferably hydrogen, methyl, ethyl, octyl, decyl, dodecyl, phenyl, benzyl, more preferably hydrogen, methyl or ethyl,
or $R^4$ and one of the radicals $R^5$ may together form a ring which includes the atoms to which $R^4$ and $R^5$ are bonded, this ring preferably containing 5 to 8 carbon atoms,
very preferably $R^4$ and one of the radicals $R^5$ are hydrogen, and the second radical and $R^5$ are hydrogen, methyl or ethyl,
$R^6$ and $R^7$=independently at each occurrence $R^5$ and/or alkoxy groups, preferably methyl groups,
$R^{11}$=independently at each occurrence a saturated or unsaturated alkyl group having 1 to 24 carbon atoms, preferably 1 to 14 carbon atoms, whose chain may be interrupted by oxygen and may further carry functional groups such as, for example carboxyl groups optionally esterified with alcohols such as methanol, ethanol, propanol, butanol or hexanol, hydroxyl groups optionally esterified with acids such as acetic acid, butyric acid or (meth)acrylic acid and/ or the polymers of (meth)acrylic acid, or an aryl group having 6 to 20 carbon atoms, or an alkaryl group having 7 to 30, preferably 7 to 20 carbon atoms, preferably a methyl, ethyl, hexyl, octyl, 2-ethylhexyl, phenyl, cresyl, tert-butylphenyl or benzyl group and/or an allyl group or a (poly) (meth)acrylic ester, the group in question more preferably being a 2-ethylhexyl group or a tert-butylphenol or benzyl group.

The fragments D, T and Q may also be described as follows:
D is a polyether radical $-(D^4)_tD^X$ where t is 2,
T is a polyether radical $-(D^4)_tD^X$ where t is 3 and
Q is a polyether radical $-(D^4)_tD^X$ where t is 4,
where
$D^X$ is a t-valent functional, saturated or unsaturated, linear or branched organic hydrocarbon radical, which may contain O, S, Si and/or N as heteroatoms, with each of the radicals $D^4$ being covalently bonded to the radical $D^X$,
the hydrocarbon radical preferably contains 8 to 1500, more preferably 20 to 1000, especially preferably 80 to 300 carbon atoms,
the carbon chain of the hydrocarbon radical is preferably interrupted by oxygen atoms,
the hydrocarbon radical preferably comprises silicon atom-containing substituents,
the silicon atom-containing substituents are preferably alkoxysilyl groups,
the hydrocarbon radical interrupted by oxygen atoms is preferably a polyoxyalkylene radical, polyether radical and/or polyetheralkoxy radical,
or $D^X$ may be a singly or multiply fused phenolic group,
or $D^X$ more preferably may be a t-valent radical of a t-tuply hydroxylated alcohol, polyetherol, polyesterol, siloxane, perfluorinated polyesterol, (poly)urethane or saccharide, preferably OH-functional polyethers, polyesters, polycarbonates, polyetheresters or perfluorinated polyethers and copolymers thereof, especially preferably OH-functional polyethers or polyesters, preferably polyethers, where $-D^X$ consists in total of at least 3 monomer units which serve for the construction of the abovementioned polymers,
and where $D^4$ is a fragment of the formula (II)

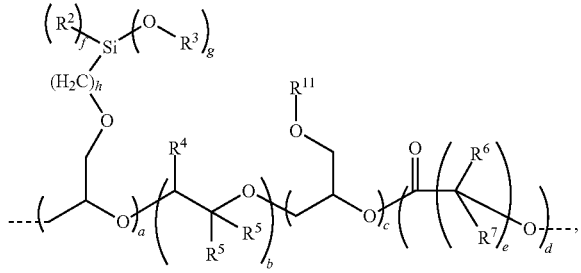

formula (II)

where a to h and $R^2$ to $R^7$ and $R^{11}$ are defined as in formula (Ia) and with the proviso that the sum total of all indices b of the formulae (Ia) and (II) makes at least 1, preferably at least 2, especially preferably at least 3, and the sum total of all indices a of the formulae (Ia) and (II) makes at least 1, preferably at least 2, especially preferably at least greater than or equal to 3.

The polyether radicals D may therefore be polyethers started with a dihydroxy-substituted compound. The polyether radicals T may be a polyether started with a trihydroxy-substituted compound. The polyether radicals Q may be polyethers started with a tetrahydroxy-substituted compound. The fragment M may be a polyether started with a monohydroxy-substituted compound.

UR are independently of one another identical or different divalent radicals of the form —U-$D^C$-U—, where U is a —C(O)—NH group which is bonded via the nitrogen to $D^C$, where $D^C$ is a divalent substituted or unsubstituted hydrocarbon radical, preferably $D^C$ is a hydrocarbon radical having 6-30 carbon atoms, especially preferably $D^C$ is an isophorone radical, AP are independently of one another identical or different radicals of the general formula (IIIa) or (IIIb)

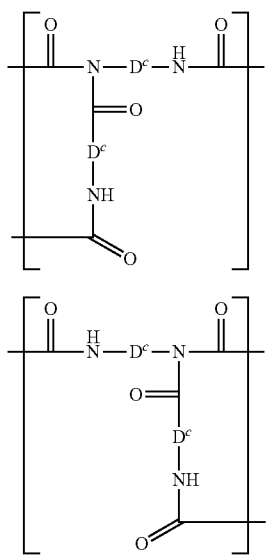

The fragment UR may be termed a urethane bridge. The fragment AP may be termed an allophanate bridge.

The radical $R^{11}$ may carry further functional groups, such as, for example, (meth)acrylic acid and/or polymers of (meth)acrylic acid. Hydroxyl groups optionally present may therefore be esterified with acrylic acid and/or methacrylic acid. The double bonds of the (meth)acrylic acid are polymerizable, under radical induction for example, UV induction for example.

The polymerization of the (meth)acrylic groups may take place after the preparation of the polyether. It may also be carried out with the alkoxylation products of the invention, with the products of the process of the invention, and also after the inventive use.

$D^X$ is a t-valent functional, organic hydrocarbon radical. A feature of the functionality is that it is capable of initiating a polymerization of alkylene oxides with ring opening, of acid esters with transesterification, and/or of acid lactones with ring opening. In this sense it represents a starter compound. The polymerization may optionally take place catalytically. Serving as catalysts may be acids, bases and metal atom-containing complexes. Preference is given to using what are called DMC catalysts. This reaction is subject to the common rules of addition that are known to the skilled person—for example, that the starter reacts preferentially on the side of the alkylene oxides that has the lower substitution, or on the carbonyl carbon of the lactones. This corresponds, in the case of the formula (II), to the left-hand side of the formula.

The OH functions of the polyethers react with the isocyanate functions to form urethane. In the case of these reactions there are generally a series of side reactions (e.g. addition of an isocyanate group onto a urethane unit to give the allophanate group) whose extent can be controlled through the choice of the reaction conditions.

Preferred alkoxylation products of the invention are those of the formula (I) in which the indices k and l are zero. Particularly preferred are alkoxylation products/polymers of the polyethers $(HD^4)_tD^X$ which are dihydroxy-functional. Particularly preferred are divalent polyethers $(HD^4)_tD^X$ which have been prepared from 3-glycidyloxypropyltriethoxysilane (GLYEO) and propylene oxide (PO) and optionally, additionally, ethylene oxide (EO) and/or glycidyl ethers and/or lactone. Especially preferred are dihydroxy-functional polyethers $(HD^4)_tD^X$ which have been prepared exclusively from GLYEO and PO or which have been prepared exclusively from GLYEO and PO and EO. The starter $D^X$ is preferably a polypropylene glycol.

Particularly preferred are alkoxylation products of the invention of the formula (I) in which the fragment M has no alkoxysilyl and/or alkylsilyl groups.

Additionally particularly preferred are alkoxylation products of the invention which based on the individual molecule have on numerical average more than one alkoxysilyl group per group UR.

Additionally preferred are alkoxylation products of the invention of the formula (I) in which k, l and v are zero. Additionally preferred are alkoxylation products in which the index i is 2, the index j is 2 to 3 and the index u is 3 to 4.

Preferred alkoxylation products of the invention are those of the formula (I) in which the indices i and j independently of one another are 1, 2, 3 or 4 and u=(j−1) to (j+1), and also k and l are zero. Especially preferred are alkoxylation products of the invention of the formula (I) in which the index a is preferably greater than or equal to 1 and/or b is in total greater than or equal to 2, preferably 8 to 400, more preferably 10 to 300, and/or alkoxylation products of the invention of the formula (I) in which other of the preferred parameters recited below are fulfilled:

Preferred are alkoxylation products of the formula (I) where the indices in the formula (I) k and l=0, j=0 to 2, i=2, u=j+1 and v=0 and the indices of the formulae (Ia) and (IIa) are in total greater than or equal to 1 and b is in total 2 to 300. Preferred are also alkoxylation products of the formula (I) where the indices of the formula (I) i and j=0 and k+l>1 and the indices of the formulae (Ia) and (IIa) are in total greater than or equal to 1 and b is in total 2 to 300. Additionally preferred are alkoxylation products of the formula (I) where at least one alkoxylation product of the formula (I) with in each case independently of one another i, j, k or l is 1 and v and u=0 is present. Preferred, moreover, are alkoxylation products of the formula (I) where the indices of the formula (I) j, k, l and v=0, i=3 to 4 and u=1. The alkoxylation products of the invention of the formula (I), and more particularly the afore-recited preferred embodiments of the alkoxylation products, are notable in that these alkoxylation products of the formula (I) with at least 10 mol % of the radicals M, based on the total amount of the radicals M, being —NH—$R^{12}$ of the formula (IVa) and/or —$NR^{12}_2$ of the formula (IVb), or at least 25 mol % or at least 51 mol % of the radicals M, based on the total amount of the radicals M, being —NH—$R^{12}$ and/or —$NR^{12}_2$, exhibit a significantly improved breaking stress, and curable compositions comprising these alkoxylation products of the formula (I) are substantially more storage-stable, relative to the otherwise identical alkoxylation product without the radicals M of the formulae (IVa) and/or (IVb), and to the otherwise identical composition therewith, respectively.

EP 2 093 244 describes how alkoxysilanes carrying epoxide functions can be selectively alkoxylated advantageously in the presence of known double metal cyanide catalysts. With the process claimed therein, the possibility is provided of performing in a reproducible manner the single and/or multiple alkoxysilyl group modification of polyoxyalkylene compounds not only terminally but also within the sequence of alkoxyalkylene units. The disclosure content of EP 2 093 244 is considered in full to be part of the present description.

The products of the invention are obtainable preferably via an alkoxylation process using double metal cyanide catalysts (DMC catalysts). In terms of their preparation and their use as alkoxylation catalysts, these catalysts have been known since the 1960s, and are depicted in U.S. Pat. Nos. 3,427,256, 3,427,334, 3,427,335, 3,278,457, 3,278,458 or 3,278,459, for example. Among the ever more effective types of DMC catalyst developed further in the subsequent years and described in U.S. Pat. Nos. 5,470,813 and 5,482,908, for example, a special position is occupied by zinc-cobalt-hexacyano complexes. By virtue of their exceptionally high activity, the preparation of polyetherols requires only low concentrations of catalysts, meaning that it is possible to do without the work-up stage that is necessary for conventional alkaline catalysts—and which consists of the neutralization, precipitation and removal by filtration of the catalyst—at the end of the alkoxylation procedure. The high selectivity of the DMC-catalysed alkoxylation is the reason why, for example, propylene oxide-based polyethers contain only very small fractions of unsaturated by-products.

Reference may also be made, for example, to EP 1 017 738, U.S. Pat. No. 5,777,177, EP 0 981 407, WO 2006/002807 and EP 1 474 464.

Examples of alkylene oxide compounds which can be used are ethylene oxide, 1,2-epoxypropane (propylene oxide), 1,2-epoxy-2-methylpropane (isobutylene oxide), epichlorohydrin, 2,3-epoxy-1-propanol, 1,2-epoxybutane (butylene oxide), 2,3-epoxybutane, 1,2-methyl-3-ethoxybutane, 1,2-epoxypentane, 1,2-epoxy-3-methylpentane, 1,2-epoxyhexane, 1,2-epoxycyclohexane, 1,2-epoxyheptane, 1,2-epoxyoctane, 1,2-epoxynonane, 1,2-epoxydecane, 1,2-epoxyundecane, 1,2-epoxydodecane, styrene oxide, 1,2-epoxycyclopentane, 1,2-epoxycyclohexane, vinylcyclohexene oxide, (2,3-epoxypropyl)benzene, viny-loxirane, 3-phenoxy-1,2-epoxypropane, 2,3-epoxypropyl methyl ether, 2,3-epoxypropyl ethyl ether, 2,3-epoxypropyl isopropyl ether, 2,3-epoxy-1-propanol, 3,4-epoxybutyl stearate, 4,5-epoxypentyl acetate, 2,3-epoxypropane methacrylate, 2,3-epoxypropane acrylate, glycidyl butyrate, methyl glycidate, ethyl 2,3-epoxybutanoate, 4-(trimethylsilyl)butane 1,2-epoxide, 4-(triethylsilyl)butane 1,2-epoxide, 3-(perfluoromethyl)propene oxide, 3-(perfluoroethyl)propene oxide, 3-(perfluorobutyl)propene oxide, 4-(2,3-epoxypropylmorpholine, 1-(oxiran-2-ylmethyl)pyrrolidin-2-one. Preference is given to using ethylene oxide, propylene oxide and butylene oxide. Particular preference is given to using ethylene oxide and propylene oxide.

Depending on the epoxide-functional alkoxysilane used and on any further monomers employed, modified alkoxylation products (III) can be prepared, and also mixtures of any desired construction.

A non-conclusive collection of alkoxysilanes substituted by epoxide groups and able to be used alone or in mixtures with one another or in combination with epoxide compounds in the context of the invention encompasses, for example, 3-glycidyloxypropyltrimethoxysilane, 3-glycidyloxypropyltriethoxysilane, 3-glycidyloxypropyltripropoxysilane, 3-glycidyloxypropyltriisopropoxysilane, bis(3-glycidyloxypropyl)diethoxysilane, bis(3-glycidyloxypropyl)diethoxysilane, 3-glycidyloxyhexyltrimethoxysilane, 3-glycidyloxyhexyltriethoxysilane, 3-glycidyloxypropylmethyldimethoxysilane, 3-glycidyloxypropylethyldiethoxysilane. These monomers can be used preferably as starting compounds (reactants) for preparing structural elements having the index (a) of the formulae (Ia) and (II).

Among the compounds which supply the radical $R^1$ of the formula (Ia), the present invention considers substances which form the start of the alkoxylation product to be prepared, especially of the formula (Ia), which is obtained by the inventive addition reaction of epoxide-functional monomers and optionally further comonomers. The starter compound used in the process of the invention is preferably selected from the group of alcohols, polyetherols or phenols. Employed with preference as starter compound is a mono- or polyhydric polyether alcohol or other alcohol. Employed with preference are mono- to tetrahydric more preferably dihydric, polyether alcohols or other alcohols.

OH-functional starter compounds $R^1$—H used, where the hydrogen is part of the hydroxyl group, are preferably compounds having molar masses of 31 to 10 000 g/mol, more preferably 50 to 2000 g/mol, more particularly 60 to 80 g/mol. The starter compounds can be used in any desired mixtures with one another or as pure substance. It is also possible to use hydroxyl compounds substituted pendently with substituents containing alkoxysilyl groups, or by alkoxysilyl groups directly, such as the silyl polyethers described in EP 2093244, as starter compounds.

As starter compounds it is advantageous to use low molecular mass polyetherols having molar masses of 50 to 2000 g/mol, which have in turn been prepared beforehand by DMC-catalysed alkoxylation.

Suitability is possessed not only by compounds having aliphatic and cycloaliphatic OH groups, but also by any desired compounds having OH functions. These include, for example, phenol, alkylphenols and arylphenols.

As di- to tetra-OH-functional starter compounds, of the formula $D^X$ with t=2 to 4, for example, it is preferred to use compounds having molar masses of 62 to 10 000 g/mol, preferably 92 to 7000 g/mol, more preferably 122 to 5000 g/mol and very preferably 2000 to 4000 g/mol. The starter compounds can be used in any desired mixtures with one another or as pure substances. It is also possible to use hydroxyl compounds substituted dependently by substituents containing alkoxysilyl groups, or by alkoxysilyl groups directly, such as the silyl polyethers described in EP 2093244, as starter compounds.

Starter compounds used advantageously are low molecular mass polyetherols having molar masses of 62 to 2000 g/mol, which have in turn been prepared beforehand by DMC-catalysed alkoxylation.

As well as compounds with aliphatic and cycloaliphatic OH groups, any desired compounds with OH functions are suitable. These include, for example, phenyl, alkylphenols and arylphenols, or else carbohydrates such as saccharides, for example; in particular, Bisphenol A and novolaks are suitable starter compounds.

The alkoxylation products of the invention can be obtained in a variety of ways. The alkoxylation products of the invention are prepared preferably by the process of the invention that is described below.

The preparation of alkoxylation products is preferably accomplished by reaction of OH-group-carrying polyethers with polyfunctional isocyanates and with compounds of the formula H—NH—$R^{12}_2$ as per formula (IVa) and/or H—$NR^{12}_2$ as per formula (IVb). Polyfunctional isocyanates for the purposes of this invention are all compounds which have at least two isocyanate groups. The polyfunctional isocyanates are more preferably diisocyanates. The use of polyfunctional isocyanates, especially of diisocyanates, has the advantage that it endows the alkoxylation product of the present invention with particular flexibility, as a result in particular of the fact that it permits subsequent functionalization, without adversely affecting the profile of the properties of the alkoxylation product. The main reason why this is surprising to the skilled person is that the urethane groups formed in the unit UR in formula (I) give the alkoxylation product an additional possibility of constructing intermolecular hydrogen bonds, and so may adversely affect the physical properties, especially the viscosity, of the alkoxylation product. Surprisingly it has been found that this can be prevented by using a combination of polyfunctional isocyanates and compounds of the formula H—NH—$R^{12}_2$ as per formula (IVa) and/or H—$NR^{12}_2$ as per formula (IVb). Products according to the invention feature an improved profile of properties, achieving high tensile shear strengths in particular and at the same time offer the possibility for further functionalization. Additionally preferred are processes in which use is made as compounds of the formula H—NH—$R^{12}_2$ as per formula (IVa) and/or H—$NR^{12}_2$ as per formula (IVb) of at least one compound selected from ethylamine, diethylamine, propylamine, dipropylamine, butylamine, dibutylamine, dicyclohexylamine, dihexylamine, 2-ethylhexylamine, di-2 (ethylhexyl)amine, ditridecylamine, aniline, 1-phenylethylamine, 2,6-xylidene, 2-phenylethylamine, benzylamine, toluidine, 2-methoxyethylamine, 3-methoxypropylamine, di-(2-methoxyethyl)amine, 2-(diethylamino)ethylamine, 3-(dimethylamino)-1-propylamine, bis[(3-dimethylamino)-propyl]amine, N-(3-aminopropyl)imidazole and polyetheramine. Processes in which such compounds are employed give rise to alkoxylation products having a particularly good breaking stress, and produce particularly stable compositions.

In a preferred process for preparing the alkoxylation products of the invention, in a first reaction step (a) polyethers of the formula $(HD^4)_rD^X$ are reacted with diisocyanates and in a second reaction step (b), the product/product mixture from the first reaction step (a) is reacted with a molecule of the formula H-M. The polyethers of the formula $(HD^4)_rD^X$ have been described above. The molecules of the formula H-M are compounds containing hydrogen bonded to the fragment M, which has been described above.

In the process of the invention the diisocyanates are used preferably in a molar excess over the polyethers $(HD^4)_rD^X$.

With further preference in the process of the invention the polyethers $(HD^4)_rD^X$ are selected such that the product contains more alkoxysilyl groups than groups UR. In other words, the sum of the structural elements with the index (a) from formulae (Ia) and (II) is preferably greater than the sum of the structural elements with the indices (u) and (v) from formula (I);

$a > u+v$.

The two reactions (a) and (b) are preferably carried out separately from one another in terms of time. Preference here is given to first reacting the polyethers $(HD^4)_rD^X$ with the diisocyanates. In this step, the stoichiometric proportions determine the number of UR fragments in the product. In the second reaction step (b), the unreacted isocyanate groups are reacted with the molecule H-M.

The reaction with the molecule H-M corresponds to an endcapping process. The aim with this reaction step is to cause preferably all of the isocyanate groups to be consumed by reaction.

In the process of the invention difunctional isocyanates can be selected from the group encompassing, for example: toluene 2,4-diisocyanate (TDI), diphenylmethane diisocyanate or methylenediphenyl diisocyanate (MDI), hexamethylene diisocyanate (HMDI), 2,2,4-trimethylhexane 1,6-diisocyanate (TMDI), polymeric diphenylmethane diisocyanate (PMDI), isophorone diisocyanate (IPDI), 4,4'-diisocyanato-dicyclohexylmethane (H12MDI); the aliphatic products are preferred, and isophorone diisocyanate (IPDI) is particularly preferred. Trifunctional isocyanates which can be used are selected from the group encompassing, for example: triphenylmethane triisocyanate, 1,3,5-benzene triisocyanate and 2,4,6-toluene triisocyanate.

Some of these isocyanates have stereocentres. In particular reference is made to the isomers of isophorone. All conceivable isomers are expressly incorporated in the scope of this invention. Thus, for example, isophorone diisocyanate can be differentiated into a cis and a trans isomer. Particularly preferred is isophorone diisocyanate composed of a 5:1 to 1:5, preferably 3:1 to 1:3, more preferably 1:1 cis/trans mixture. A particularly preferred commercial product consists of a 3:1 cis/trans mixture. The use of commercial isophorone diisocyanate is preferred. Isophorone diisocyanate is also available under other names, which are included as synonyms in the scope of this invention: 3-isocyanatomethyl-3,5,5-trimethyl-cyclohexylisocyanate, 5-isocyanato-1-(isocyanatomethyl)-1,3,3-trimethylcyclohexane, CAS No.: 4098-71-9. Various trade names are customary; they often contain the name of the parent molecule isophorone, although other trade names are also customary: e.g. Desmodur®I (BAYER), Isocur IPDI 22-200 (ISO-ELEKTRA), VESTANAT® IPDI (EVONIK INDUSTRIES), which are likewise incorporated within the scope of the present invention. Customary specifications for isophorone diisocyanate are: total chlorine content <400 mg/kg, hydrolysable chlorine <200 mg/kg, purity >99.5 wt %, refractive index $n^{25}_D$ 1.483 (DIN 51 423, part 2), NCO content 37.5-37.8 wt % (EN ISO 11 909/ASTM D 2572); the commercial product is described as being colourless to pale yellow.

Isocyanates can oligomerize. Commercial products frequently include greater or lesser quantities of such oligomers. They may be described, for example, by the following formulae:

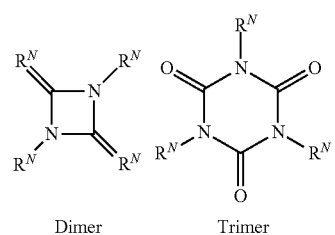

Dimer    Trimer $R^N$ denotes the isocyanate radical. The skilled person can derive the structures intended here from the isocyanates stated above. The dimers and trimers should be considered homodimers and homotrimers, respectively.

In the case of the abovementioned diisocyanates, it would be possible here for structures to be formed which are in a position to contain, as analogous bridge elements to UR, corresponding urethanes which are derivable directly from the dimeric diisocyanates shown.

The trimeric diisocyanates may be in a position to react with more than two polyethers $(HD^A)_r D^X$. In that case, analogous bridging elements to AP might be formed; these triurethanes are derivable in the same way from the structure shown above.

For the reaction of the molecules H-M and polyethers $(HD^A)_r D^X$ with diisocyanates, it may be necessary to accelerate the reaction by catalysis. Catalysts used are the tin, bismuth and titanium catalysts well known to the skilled person from urethane chemistry, such as dibutyltin laurate, dioctyltin diketonate, dibutyltin dilaurate, dioctyltin dilaurate, available for example under the trade name TIB KAT® 216 (Goldschmidt TIB/TIB Chemicals), dibutyltin diacetylacetonate, dibutyltin diacetate, dibutyltin dioctoate, or dioctyltin diacetylacetonate, Borchi® catalysts, bismuth oxides, bismuth carboxylate, available for example under the trade name TIB KAT® 722 (Goldschmidt TIB/TIB Chemicals), bismuth methanesulphonate, bismuth nitrate, bismuth chloride, triphenylbismuth, bismuth sulphide, and also preparations comprising these catalysts, and titanates, e.g. titanium (IV) isopropoxide, iron(III) compounds, e.g. iron(III) acetylacetonate, and aluminium compounds, such as aluminium triisopropoxide, aluminium tri-sec-butoxide and other alkoxides and also aluminium acetylacetonate.

Also suitable, furthermore, are zinc salts, such as zinc octoate, zinc acetylacetonate and zinc 2-ethylcaproate, or tetraalkylammonium compounds, such as N,N,N-trimethyl-N-2-hydroxypropylammonium hydroxide, N,N,N-trimethyl-N-2-hydroxypropylammonium 2-ethylhexanoate, or choline 2-ethylhexanoate. Preference is given to using zinc octoate (zinc-2-ethylhexanoate), dioctyltin dilaurate, bismuth oxides, bismuth carboxylate, bismuth catalyst preparations and/or the tetraalkylammonium compounds, and particular preference to the use of zinc octoate, dioctyltin dilaurate and/or bismuth carboxylate, and also to preparations with bismuth catalysts.

The catalyst is used preferably in concentrations of 5-5000 ppm. The amount in which the catalyst is used may considerably influence the composition of the end product. For different catalysts it may therefore be advisable to select different use concentrations. For example, organotin catalysts can be used preferably in concentrations of 5-150 ppm, and bismuth carboxylates preferably in concentrations of 300-2000 ppm.

In the case of the fragments M of the molecules of the formula H-M, the hydrogen is bonded to an oxygen or nitrogen atom. The molecules of the formula H-M therefore correspond to alcohols, or to primary or secondary amines.

Suitable amines of the formula H-M, with M being of formulae (IVa) and (IVb), are, for example, ethylamine, diethylamine, propylamine, dipropylamine, butylamine, dibutylamine, dicyclohexylamine, dihexylamine, 2-ethylhexylamine, di(2-ethylhexyl)amine, ditridecylamine, aniline, 1-phenylethylamine, 2,6-xylidene, 2-phenylethylamine, benzylamine, toluidine, 2-methoxyethylamine, 3-methoxypropylamine, di-(2-methoxyethyl)amine, 2-(diethylamino)ethylamine, 3-(dimethylamino)-1-propylamine, bis[(3-dimethylamino)propyl]amine, N-(3-aminopropyl) imidazole or isomers thereof. Suitable amines are also polyetheramines, which are sold, for example, under the name Jeffamin, an example being Jeffamin® M 2070.

Alcohols of the formula H-M, with M being of formula (IVc), which may be used advantageously are, for example, allyl alcohol, 2-allyloxyethanol, vinyl alcohol, ethanol, and also all isomers of propanol, of butanol, of pentanol, of hexanol, of heptanol, of octanol and of nonanol.

Furthermore, fatty alcohols in particular may be used. Typical examples are capryl alcohol, 1-undecanol, lauryl alcohol, 1-tridecanol, isotridecyl alcohol, myristyl alcohol, 1-pentadecanol, cetyl alcohol, palmoleyl alcohol, 1-heptadecanol, stearyl alcohol, isostearyl alcohol, oleyl alcohol, elaidyl alcohol, petroselinyl alcohol, linolyl alcohol, linolenyl alcohol, 1-nonadecanol, elaeostearyl alcohol, arachyl alcohol, 1-heneicosanol, gadoleyl alcohol, behenyl alcohol, erucyl alcohol and brassidyl alcohol, and also their technical mixtures. In addition to the compound class of the oxo-process alcohols, which usually carry 2 to 4 methyl groups as branches, it is also possible to use what are called Guerbet alcohols, which are branched with an alkyl group in position 2, as starter compounds. Suitable Guerbet alcohols include 2-ethylhexanol, 2-butyloctanol, 2-hexyldecanol and/or 2-octyldodecanol.

Cyclic alcohols as well, such as cyclopentanol, 1-methylcyclopentanol, cyclohexanol, furfuryl alcohol and solketal, can be used as alcohols.

Suitable alcohols are also any mono-OH-terminal polyethers or polalkylene oxides such as, for example, methyl- or butyl-started polyethylene or polypropylene oxides and/or their mixed oxides.

Particularly preferred for use are butanol, 2-ethylhexanol, nonanol, isononanol, 3,5,5-trimethylhexanol, decanol and isotridecyl alcohol, or a polyether consisting of polypropylene oxide prepared starting from butanol; more preferably M corresponds to $C_4H_9O[CH_2CH(CH_3)O]_{3\ to\ 8}$, especially preferably with M corresponding to $C_4H_9O[CH_2CH(CH_3)O]_{5-6}$.

Alkoxylation products of the invention can be prepared/obtained preferably by any process suitable for obtaining alkoxylation products of the invention. Particularly preferred alkoxylation products of the invention are those which are preparable/obtainable or prepared/obtained by processes described below.

The present invention accordingly further provides processes preferably for the preparation of alkoxylation products. Processes described below are especially suitable for preparing alkoxylation products of the invention in general and also, in particular, for preparing alkoxylation products of the invention comprising the described preferred embodiments of the alkoxylation products of the invention.

The claimed process for preparing the final alkoxylation products may consist of a two-stage reaction sequence, where preferably in a first reaction step (a) polyethers of the formula $(HD^A)_r D^X$ are reacted with diisocyanates (as defined above) and in a second reaction step (b) the product of the first reaction step (a) is reacted with a molecule of the formula H-M.

In preferred processes of the invention for preparing alkoxylation products, the polyethers $(HD^A)_r D^X$ and the diisocyanates may react preferably in the presence of a catalyst. Diisocyanates in a molar excess over the polyethers $(HD^A)_r D^X$ may be used with preference.

Preferably in the process of the invention, in reaction step (a), polyethers $(HD^A)_r D^X$ and diisocyanates are mixed with one another. Diisocyanates may preferably be added to the polyethers $(HD^A)_r D^X$. The diisocyanates may be added preferably to heated polyethers $(HD^A)_r D^X$. The mixing is per-formed preferentially at an elevated temperature, encompassing temperatures greater than 25° C., more preferably at temperatures of 40° C. to 100° C., especially preferably at 60° C. to 80° C. The reaction may take place preferably in the presence of a catalyst, especially preferably in concentrations of 5-5000 ppm. It may further be preferable for the catalyst to be added at the mixing temperature, encompassing temperatures greater than 25° C., more preferably at temperatures from 40° C. to 100° C., especially preferably at 60° C. to 80° C. The mixture comprising diisocyanates and polyethers $(HD^A)_rD^X$ and also, preferably, catalyst is preferably stirred before and/or during and/or after the addition of individual components. Stirring in the sense of this invention means any kind of mixing of a reaction mixture. The stirring may take place preferably at elevated temperature, encompassing temperatures greater than 25° C., more preferably at temperatures of 40° C. to 100° C., especially preferably at 60° C. to 80° C. Stirring takes place preferably throughout the reaction time. The mixture may especially preferably be stirred, preferably at the mixing temperature, for 15 minutes to 90 minutes, more preferably 30 minutes to 60 minutes, more particularly 45 minutes.

If desired, catalyst may also be supplied to the reaction mixture as particularly preferred component, especially preferably in concentrations of 5-5000 ppm, based on the total concentration of all the catalysts in the reaction mixture, and/or diisocyanates and/or polyethers $(HD^A)_rD^X$ may be supplied as particularly preferred components.

The temperature of the mixture may subsequently be altered. It may be especially preferable that the mixing temperature can be 60° C.-90° C. and this temperature can be maintained for subsequent process steps.

Preferably, the molecule H-M is also added to the reaction mixture in the reaction step (b). The molecule H-M may be preferably added at 60 to 80° C., especially preferably at 65 to 75° C. Stirring may preferably (continue to) be carried out during and/or after the addition of the molecule H-M. With particular embodiments it may be an advantage to make a further addition of catalyst before or during the reaction with H-M. In the case of this renewed addition of catalyst, either the same catalyst as added in the first reaction step or else a different catalyst may be added. Stirring of the mixture may be carried on, preferably at the elevated temperature, for a number of hours, preferably 1 to 8 hours, more preferably 1.5 to 4 hours, more particularly 3 hours. The steps of the process may be carried out in any order. In one particular preferred embodiment, the order of the process steps follows the above-recited order of their description.

The reaction products may subsequently be cooled, preferably to room temperature. It is also possible, however, to supply the reaction mixture with further components such as catalysts, $(HD^A)_rD^X$ and diisocyanates, and also, optionally, compounds H-M and to continue the reaction. In the course of this reaction it is additionally possible, for example, to add one or more catalysts, which may be the same as or different from the catalyst or catalysts used in reaction steps (a) and (b). It is possible, moreover, for example in addition to add one or more compounds of the formula H-M, which may be the same as or different from the compound or compounds H-M metered in before. It is also additionally possible, for example, to add one or more diisocyanates, which may be the same as or different from the diisocyanate or diisocyanates used before in reaction steps (a).

Particularly preferred components that may be added to the reaction mixture are catalyst, especially preferably in concentrations of 5-5000 ppm based on the overall concentration of all the catalysts in the reaction mixture, and/or diisocyanates and/or polyethers $(HD^A)_rD^X$, preferably just catalyst. The components may be supplied simultaneously or in succession and/or else in portions, preferably in 2 to 12 portions, to the reaction mixture. In one preferred embodiment, catalyst and at least one further component selected from diisocyanates and/or polyethers $(HD^A)_rD^X$ may be supplied in alternation to the reaction mixture, in which case the total amount of the individual components in each case may be subdivided into 2 to 12 portions, with, optionally, each portion of the selected components being added to the reaction mixture in alternation. If catalyst is supplied to the reaction mixture, it may be preferable to add the same catalyst as optionally in the preceding reaction step, preferably in portions, or else to add one or more further catalysts, different from the optional first catalyst, preferably in portions. The addition of further components may take place preferably at elevated temperature, encompassing temperatures greater than 25° C., more preferably at temperatures of 40° C. to 100° C., especially preferably at 60° C. to 80°, and very preferably at constant temperature, encompassing temperature changes of 5° C. more or less than in the preceding step. The reaction mixture is preferably stirred before and/or during and/or after the addition of further components, especially preferably catalyst and/or diisocyanates and/or polyethers $(HD^A)_rD^X$. The mixture may be stirred preferably for a number of hours, more preferably 1 to 8 hours, more particularly 1.5 to 4 hours. If desired, the addition of further components, preferably of catalyst, may be carried out one or more times, in other words twice, thrice, four times, etc., in other words as often as desired, more preferably once, within the above-indicated temperature ranges and optionally under the recited stirring conditions.

Especially preferred in accordance with the invention are those processes which take place in the presence of a catalyst, especially preferably in concentrations of 5-5000 ppm, and in which as a further component catalyst is added at least one further time, preferably in portions, especially preferably in concentrations of 5-5000 ppm, based on the total concentration of all the catalysts in the reaction mixture.

On account of their alkoxysilyl groups, which are sensitive to hydrolysis and have a tendency to undergo crosslinking, these alkoxylation products of the invention represent curable modified polymers or oligomers. Their crosslinking to solid thermoset end products, or else, depending on the choice of the crosslinking density or particular adjuvants, to elastomeric or thermoplastic end products, is accomplished in a simple way in the presence of water and, optionally, with addition of a catalyst. This catalyst may be, for example, an acid or base, or else a metal-containing compound. The pot-life can be controlled, curtailed, for example, by variation, for example increasing the temperature during the curing process. For example, through a variation in the fraction of alkoxysilane units in the modified polymer chain, it is possible to influence the crosslinking density and hence the mechanical and physicochemical properties profile of the cured modified polymers within wide limits.

Besides the alkoxylation product of the invention and/or the product of the process of the invention, of the formula (I), the compositions of the invention preferably comprise further adjuvants selected from the group of plasticizers, fillers, solvents, emulsifiers, adhesion promoters, additives for modifying the flow behaviour, referred to as rheology additives, and at least one curing catalyst. Where necessary, it is also possible for additives for chemical drying, and/or stabilizers against thermal and/or chemical exposures and/or exposures to ultraviolet and visible light, to be introduced into the formulation.

The fraction of the alkoxylation products of the invention in the composition of the invention is preferably from 10 to 90 wt %, preferably from 15 to 70 wt % and more preferably from 20 wt % to 65 wt %.

Curing catalysts used (for the crosslinking or polymerization of the composition of the invention or for the chemical attachment thereof to particle surfaces or macroscopic surfaces) may be the catalysts typically employed for the hydrolysis and condensation of alkoxysilanes. Curing catalysts employed with preference are organotin compounds, such as dibutyltin dilaurate, dibutyltin diacetylacetonate, dibutyltin diacetate, dibutyltin dioctoate, or dioctyltin dilaurate, dioctyltin diacetylacetonate, dioctyltin diketanoate, dioctylstannoxane, dioctyltin dicarboxylate, dioctyltin oxide, preferably dioctyltin diacetylacetonate, dioctyltin dilaurate, dioctyltin diketanoate, dioctylstannoxane, dioctyltin dicarboxylate, dioctyltin oxide, more preferably dioctyltin diacetylacetonate and dioctyltin dilaurate. Also used, furthermore, may be zinc salts, such as zinc octoate, zinc acetylacetonate and zinc-2-ethylcaproate, or tetraalkylammonium compounds, such as N,N,N-trimethyl-N-2-hydroxypropylammonium hydroxide, N,N,N-trimethyl-N-2-hydroxypropylammonium 2-ethylhexanoate or choline 2-ethylhexanoate.

Preference is given to the use of zinc octoate (zinc 2-ethylhexanoate) and of the tetraalkylammonium compounds, particular preference to that of zinc octoate. Use may further be made of bismuth catalysts as well, e.g. Borchi®catalysts, titanates, e.g. titanium(IV) isopropoxide, iron(III) compounds, e.g. iron(III) acetylacetonate, aluminium compounds, such as aluminium triisopropoxide, aluminium tri-sec-butoxide and other alkoxides and also aluminium acetylacetonate, calcium compounds such as calcium disodium ethylenediamine tetraacetate or calcium diacetylacetonate, or else amines, e.g. triethylamine, tributylamine, 1,4-diazabicyclo[2.2.2]octane, 1,8-diazabicyclo[5.4.0]undec-7-ene, 1,5-diazabicyclo[4.3.0]non-5-ene, N,N-bis(N,N-dimethyl-2-aminoethyl)methylamine, N,N-dimethylcyclohexylamine, N,N-dimethylphenylamine, N-ethylmorpholine etc. Organic or inorganic Brønsted acids as well, such as acetic acid, trifluoroacetic acid, methanesulphonic acid, p-toluenesulphonic acid or benzoyl chloride, hydrochloric acid, phosphoric acid, its monoesters and/or diesters, such as butyl phosphate, (iso)propyl phosphate, dibutyl phosphate, etc., for example, are suitable as catalysts. It is of course also possible to employ combinations of two or more catalysts.

The fraction of the curing catalysts in the composition of the invention is preferably from 0.1 wt % to 5.00 wt %, more preferably from 0.15 to 2.00 wt % and very preferably from 0.2 to 0.75 wt %, based on the overall composition.

The compositions of the invention may also comprise what are called photolatent bases as catalysts, of the kind described in WO 2005/100482. Photolatent bases are preferably organic bases having one or more basic nitrogen atoms, which initially are present in a blocked form and which release the basic form only on irradiation with UV light, visible light or IR radiation, through splitting of the molecule. The content of the description and the claims of WO 2005/100482 is hereby introduced as part of the present disclosure.

The catalyst or the photolatent base is used in amounts of 0.001 to 5.0 wt %, preferably 0.01 to 1.0 wt % and very preferably 0.05 to 0.9 wt %, based on the sum total mass of the reaction components. The catalyst or the photolatent base may be added in one portion or alternatively in portions or else continuously. Preferred is the addition of the total amount in one portion.

The composition of the invention may comprise further adjuvants selected from the group of plasticizers, fillers, solvents, adhesion promoters, additives for modifying the flow behaviour, known as rheology additives, and drying agents, more particularly chemical moisture-drying agents.

The composition of the invention preferably comprises one or more adhesion promoters and/or one or more drying agents, more particularly chemical moisture-drying agents.

As adhesion promoters it is possible for the adhesion promoters known from the prior art, more particularly aminosilanes to be present in the composition of the invention. Adhesion promoters which can be used are preferably compounds which carry alkoxysilyl groups and which additionally possess primary or secondary amine groups, vinyl groups, thio groups, aryl groups or alternatively oxirane groups, such as 3-aminopropyltrimethoxysilane (Dynasylan® AMMO (Evonik)), N-(2-aminoethyl)-3-aminopropyltrimethoxysilane (Dynasylan® DAMO (Evonik)), N-(n-butyl)aminopropyltrimethoxysilane (Dynasylan® 1189 (Evonik)), 3-mercaptopropyltrimethoxysilane (Dynasylan® MTMO, Evonik), 3-glycidyloxypropyltriethoxysilane (Dynasylan® GLYEO, Evonik) 3-glycidyloxypropyltrimethoxysilane (Dynasylan® GLYMO, Evonik), phenyltrimethoxysilane (Dynasylan® 9165 or Dynasylan® 9265, Evonik) or oligomeric amino/alkyl-alkoxysilanes such as, for example, Dynasylan® 1146 (Evonik), in each case alone or in a mixture. Adhesion promoters preferably present are, for example, 3-aminopropyltriethoxysilane (Geniosil® GF 93 (Wacker), Dynasylan® AMEO (Evonik®)) and/or (3-aminopropyl)methyldiethoxysilane (Dynasylan® 1505 (Evonik®)), 3-aminopropyltrimethoxysilane (Dynasylan® AMMO (Evonik)), N-(2-aminoethyl)-3-aminopropyltrimethoxysilane (Dynasylan® DAMO (Evonik)), Dynasylan® 1146 (Evonik), more preferably 3-aminopropyltriethoxysilane, 3-aminopropyltrimethoxysilane, N-(2-aminoethyl)-3-aminopropyltrimethoxysilane, Dynasylan® 1146, and especially preferably 3-aminopropyltrimethoxysilane, 3-aminopropyltriethoxysilane, N-(2-aminoethyl)-3-aminopropyltrimethoxysilane and Dynasylan® 1146.

The fraction of the adhesion promoters in the composition of the invention is preferably from greater than 0 to 5.0 wt %, more preferably from 0.5 to 4.0 wt % and very preferably from 1.0 to 2.5 wt %, based on the overall composition.

It may be advantageous if the composition of the invention comprises a drying agent, in order, for example to bind moisture or water introduced by formulation components, or incorporated subsequently by the filling operation or by storage. Drying agents which can be used in the compositions of the invention are in principle all of the drying agents known from the prior art. Chemical drying agents which can be used include, for example, vinyltrimethoxysilane (Dynasylan® VTMO, Evonik or Geniosil® XL 10, Wacker AG), vinyltriethoxysilane (Dynasylan® VTEO, Evonik or Geniosil® GF 56, Wacker), vinyltriacetoxysilane (Geniosil® GF 62, Wacker), N-trimethoxysilylmethyl-O-methyl-carbamate (Geniosil® XL 63, Wacker), N-dimethoxy(methyl)silylmethyl-O-methyl-carbamate, N-methyl[3-(trimethoxysilyl)propyl]carbamate (Geniosil® GF 60, Wacker), vinyldimethoxymethylsilane (Geniosil® XL 12, Wacker), vinyltris(2-methoxyethoxy)silane (Geniosil® GF 58, Wacker), bis(3-triethoxysilylpropyl)amine (Dynasylan® 1122, Evonik), bis(3-trimethoxysilylpropyl)amine (Dynasylan® 1124), N-dimethoxy(methyl)silylmethyl-O-methyl-carbamate (Geniosil® XL 65, Wacker) or oligomeric vinylsilanes such as, for example, Dynasylan® 6490 and Dynasylan® 6498 (both acquirable from Evonik) alone or in a mixture. Preference is given to using vinyltrimethoxysilane (Dynasylan® VTMO, Evonik or Geniosil® XL 10, Wacker AG), vinyltriethoxysilane (Dynasylan® VTEO, Evonik or Geniosil® GF 56, Wacker) as drying agents. As a chemical moisture-drying agent, the composition of the invention comprises preferably vinyltrimethoxysilane (Dynasylan® VTMO, Evonik or Geniosil® XL 10, Wacker AG). Furthermore, in addition to or as an alternative to the chemical drying, a physical drying agent may be used, such as zeolites, molecular sieves, anhydrous sodium sulphate or anhydrous magnesium sulphate, for example.

The fraction of the drying agent in the composition of the invention is preferably from greater than 0 to 5 wt %, more preferably from 2 to 3 wt %, based on the overall composition.

The composition of the invention may comprise one or more adjuvants selected from the group of plasticizers, fillers, solvents and additives for adapting the flow behaviour (rheology additives).

The plasticizers may for example be selected from the group of the phthalates, the polyesters, alkylsulphonic esters of phenol, cyclohexanedicarboxylic esters, or else of the polyethers. Plasticizers used are only those compounds which are different from the alkoxylation products of the invention of the formula (I).

If plasticizers are present in the composition of the invention, the fraction of the plasticizers in the composition of the invention is preferably from greater than 0 wt % to 90 wt %, more preferably 2 wt % to 70 wt %, very preferably 5 wt % to 50 wt %, based on the overall composition.

Fillers which can be used are, for example, precipitated or ground chalk, inorganic carbonates in general, precipitated or ground silicates, precipitated or fumed silicas, glass powders, hollow glass beads (known as bubbles), metal oxides, such as $TiO_2$, $Al_2O_3$, for example, natural or precipitated barium sulphates, reinforcing fibres, such as glass fibres or carbon fibres, long or short fibre wollastonites, cork, carbon black or graphite. With advantage it is possible to use hydrophobized fillers, since these products exhibit lower introduction of water and improve the storage stability of the formulations.

If fillers are present in the composition of the invention, the fraction of the fillers in the composition of the invention is preferably from 1 to 70 wt % based on the overall composition, with concentrations of 30 to 65 wt % being particularly preferred for the fillers stated here, with the exception of the fumed silicas. If fumed silicas are used, a particularly preferred fumed silica fraction is from 2 to 20 wt %.

As rheology additives, preferably present in addition to the filler, it is possible to select from the group of the amine waxes, acquirable for example from Cray Valley under the brand name Crayvallac®, hydrated vegetable oils and fats, fumed silicas, such as Aerosil® R202 or R805 (both acquirable from Evonik) or Cab-O-Sil® TS 720 or TS 620 or TS 630 (sold by Cabot), for example. If fumed silicas are already being used as a filler, there may be no need to add a rheology additive.

If rheology additives are present in the composition of the invention, the fraction of the rheology additives in the composition of the invention, depending on the desired flow behaviour, is preferably from greater than 0 wt % to 10 wt %, more preferably from 2 wt % to 6 wt %, based on the overall composition.

The compositions of the invention may comprise solvents. These solvents may serve, for example, to lower the viscosity of the uncrosslinked mixtures, or may promote flow onto the surface. Solvents contemplated include in principle all solvents and also solvent mixtures. Preferred examples of such solvents are ethers such as, tert-butyl methyl ether, esters, such as ethyl acetate or butyl acetate or diethyl carbonate, and also alcohols, such as methanol, ethanol and also the various regioisomers of propanol and of butanol, or else glycol types, which are selected according to the specific application. Furthermore, aromatic and/or aliphatic solvents may be employed, including halogenated solvents as well, such as dichloromethane, chloroform, carbon tetrachloride, hydrofluorocarbons (FREON), etc., and also inorganic solvents such as, for example, water, $CS_2$, supercritical $CO_2$ etc.

As and when necessary, the compositions of the invention may further comprise one or more substances selected from the group encompassing co-crosslinkers, flame retardants, deaerating agents, antimicrobial and preservative substances, dyes, colorants and pigments, frost preventatives, fungicides and/or reactive diluents and also complexing agents, spraying assistants, wetting agents, fragrances, light stabilizers, radical scavengers, UV absorbers and stabilizers, especially stabilizers against thermal and/or chemical exposures and/or exposures to ultraviolet and visible light.

UV stabilizers used may be, for example, known products based on hindered phenolic systems. Light stabilizers used may be, for example, those known as HALS amines. Stabilizers which may be used include, for example, the products or product combinations known to the skilled person and made up for example of Tinuvin® stabilizers (Ciba), such as Tinuvin® stabilizers (Ciba), for example Tinuvin® 1130, Tinuvin® 292 or else Tinuvin® 400, preferably Tinuvin® 1130 in combination with Tinuvin® 292. The amount in which they are used is guided by the degree of stabilization required.

In addition, the curable compositions may be admixed with co-crosslinkers in order to boost mechanical hardness and reduce the propensity to flow. Such co-crosslinkers are typically substances capable of providing 3, 4 or more crosslinkable groups. Examples in the context of this invention are 3-aminopropyltriethoxysilane, tetramethoxysilane or tetraethoxysilane.

As further components the compositions of the invention may preferably comprise further, usually monomeric, silanes, hydroxyl group-bearing siloxanes, or solvents.

Further silanes used may be in principle all silanes, preferably having hydrolysable alkoxy groups, and more particularly silanes which carry amine groups or vinyl groups, and also silanes which are described in DE 10 2006 054155 or WO 2005/003201.

Compounds dubbed monosilanol-forming compounds are those which carry exactly one silanol group, or are capable of forming such by reaction with moisture. Examples of compounds which carry silanol groups include the following structures: $(CH_3)_3SiOH$, $(CH_3CH_2)_3SiOH$, $(CH_3CH_2CH_2)_3SiOH$, $(C_6H_{10})_3SiOH$, $(C_6H_{10})_2CH_3SiOH$, $R_3Si$—O—$SiR_2$—OH (where R may be a hydrocarbon, or else may be a siloxane), $(C_6H_{10})(CH_3CH_2)_2SiOH$, $(C_6H_{10})_2CH_3CH_2SiOH$.

Preferred compounds are those of the type $R_3Si$—OH, in which R is a methyl, ethyl, propyl, vinyl or phenyl group, the methyl group being particularly preferred. It is also possible to use all chlorosilanes and chlorosiloxanes which react with OH groups, such as $(CH_3)_3SiCl$, for example.

Examples of compounds which are capable of forming silanol-bearing compounds with moisture are (N,N-dimethylamino)triethylsilane, (N,N-dimethylamino)trimethylsilane, N,O-bis(trimethylsilyl)acetamide, N,O-bis(triethylsilyl)acetamide, N-(trimethyl-ethylsilyl)acetamide, bistrimethylsilylurea, hexamethyldisilazane, 1,1,3,3-tetramethyldisilazane, trimethylsilylphenoxide, trimethylsilyl alkoxide (where the parent alcohol is from the C1-C10 alcohols group)

and dimethylsilyldiethylamine, with particular advantage attaching to the use of hexamethyldisilazane.

Use may also be made of compounds of the formula $R_3Si-O-X$, where X may stand for elements from the group of the halogens, but also the hydrocarbons which include an acidic hydrogen atom. These hydrocarbons with acidic hydrogen atom may be derived from the group of the alcohols, preferably methanol, ethanol, propanol, butanol and isobutanol, but also from carboxylic acids, as for example formic acid, acetic acid, propanoic acid, succinic acid, lauric acid, palmic acid, stearic acid, acrylic acid, methacrylic acid, oleic acid, linolic acid, oxalic acid, maleic acid, adipic acid, benzoic acid, phthalic acid, terephthalic acid, and also the anhydrides of these acids, since the acid may likewise be formed from them by ingress of moisture. Furthermore, R may consist of primary or secondary amines. Mention may be made here, by way of example, of ammonia, methylamine, dimethylamine, ethylamine, diethylamine, propylamine, dipropylamine, butylamine, phenylamine. Further possibilities are acid amides and ketones.

When using the particularly preferred hexamethyldisilazane, but also when using many other silanol-forming compounds, it is advantageous to add an organic acid from the group of the carboxylic acids to the reaction mixture, since this significantly increases the yield of the reaction. Examples here include the following: formic acid, acetic acid, propionoic acid, succinic acid, lauric acid, palmic acid, stearic acid, acrylic acid, methacrylic acid, oleic acid, linolic acid, oxalic acid, maleic acid, adipic acid, benzoic acid, phthalic acid, terephthalic acid, with acetic acid, propionoic acid, maleic acid, and oleic acid being preferred. When HMDS is used together with the carboxylic acid which here acts catalytically, there is no competing reaction by the carboxylic acid of the HMDS for the OH function that is to be capped. The acids react here preferentially with the nitrogen of the HMDS. Particularly preferred is oleic acid, since it is not very volatile under the reaction conditions, causes virtually no instances of discoloration, and is devoid of unpleasant odour. Additionally or alternatively it is also possible to achieve catalysis of the reaction by using a nitrogen base such as triethylamine, pyridine, aminopyridine or imidazole.

The compositions of the invention may be, for example, adhesives or sealants or may be used for producing an adhesive or sealant.

The compositions of the invention may be used in particular for reinforcing, levelling, modifying, adhesively bonding, sealing and/or coating of substrates. Examples of suitable substrates include particulate or sheetlike substrates. A further possibility for service is use in the construction industry or in vehicle building, for the sealing and bonding of structural elements and components, and also for coating of porous or non-porous, particulate or sheetlike substrates. The alkoxylation products that are used in this invention may be used outstandingly as the basis of a curable composition for the coating and modifying of surfaces and fibres. Further examples which may be given here are applications on metals, in that case in particular the construction materials such as iron, steel, stainless steel and cast iron, ferrous materials, aluminium, mineral substrates, such as stone, screeding, mortar and concrete, ceramics, glasses, ceramic materials, based in particular on solid metal oxides or non-metal oxides or carbides, aluminium oxide, magnesium oxide or calcium oxide, and also mineral substrates or organic substrates, polyesters, glass fibre-reinforced polyester, polyamide, textiles and fabrics made from cotton and polyester, cork and/or wood. The composition may also be utilized for the binding, reinforcing and levelling of uneven, porous or fragmentary substrates, such as mineral substrates, chipboard and fibreboard panels comprising wood or cork, composite materials such as, for example, wood composite materials such as MDF boards (median-density fibreboards), WPC articles (wood plastic composites), chipboard, cork articles, laminated articles, ceramics, and also natural fibres and synthetic fibres.

As a result of this broad spectrum of adhesion, they are also suitable for the bonding of combinations of materials comprising the substrates stated. In this context it is not critical whether the surfaces are smooth or roughened or porous. Roughened or porous surfaces are preferred, on account of the greater area of contact with the adhesive.

The alkoxylation products may therefore serve, for example, as base materials for the preparation of adhesives, as reactive crosslinkers, as adhesion promoters and primers and also binders for metals, glass and glass fibres/glass fabrics, wood, wood-based materials, natural fibres, for the finishing and treatment of textile and non-textile fabrics and fibres made from natural and/or synthetic and also mineral raw materials, and also, for example, cork, leather, paper, tissue and silicatic and oxidic materials.

The examples listed below illustrate the present invention by way of example, without any intention of restricting the invention, the scope of application of which is apparent from the entirety of the description and the claims, to the embodiments specified in the examples.

Unless explicitly characterized, all figures for relative proportions (fractions in %) are given in percent by weight.

OPERATIVE EXAMPLES

The subject matter of the present invention is elucidated in more detail below, without any intention that the subject matter of the invention should be confined to these exemplary embodiments.

1. Synthesis Examples

The following polyethers containing alkoxysilyl groups were used, and were prepared in accordance with the process principle, set out in EP 2093244, of the DMC-catalysed alkoxylation of 3-glycidyloxypropyltriethoxysilane (GLYEO) with propylene oxide (PO):

Silyl Polyether SP-1:
Polypropylene glygol-started, virtually colourless polyether of average molar mass Mw about 14 000 g/mol and fourfold triethoxysilane functionality.
Chemical structure according to monomer metering:
PPG (2000 g/mol)+68 mol PO+a mixture of 4 mol GLYEO and 119 mol PO Silyl Polyether SP-2:
Polypropylene glygol-started, virtually colourless polyether of average molar mass Mw about 14 000 g/mol and twofold triethoxysilane functionality.
Chemical structure according to monomer metering:
PPG (2000 g/mol)+18 mol PO+a mixture of 2 mol GLYEO and 180 mol PO Example 1

505 g of silyl polyether SP-1 were introduced, heated to 60° C. and admixed with 16 g of IPDI. Then 0.5 g of TIB KAT 722 was added. The mixture was stirred for 45 minutes. Thereafter 5.3 g of n-butylamine were added and the reaction mixture is stirred at 80° C. for three hours more.

This gave a clear, colourless product.

Example 2

505 g of silyl polyether SP-2 were introduced, heated to 60° C. and admixed with 16 g of IPDI. Then 0.5 g of TIB KAT 722 was added. The mixture was stirred for 45 minutes.

Thereafter 5.3 g of n-butylamine were added and the reaction mixture is stirred at 80° C. for three hours more.

This gave a clear, colourless product.

Example 3

510 g of silyl polyether SP-1 were introduced, heated to 80° C. and admixed with 16 g of IPDI. Then 0.03 g of dioctyltin laurate was added. The mixture was stirred for 45 minutes. Thereafter 4.3 g of n-butylamine were added and the reaction mixture is stirred at 80° C. for three hours more.

This gave a clear, colourless product.

Example 4

509 g of silyl polyether SP-2 were introduced, heated to 80° C. and admixed with 16 g of IPDI. Then 0.03 g of dioctyltin laurate was added. The mixture was stirred for 45 minutes. Thereafter 4.3 g of n-butylamine were added and the reaction mixture is stirred at 80° C. for three hours more.

This gave a clear, colourless product.

Example 5

507 g of silyl polyether SP-1 were introduced, heated to 60° C. and admixed with 16 g of IPDI. Then 0.5 g of TIB KAT 722 was added. The mixture was stirred for 45 minutes. Thereafter 2.6 g of n-butylamine and 13.8 g of a polyether of the general formula $C_4H_9O[CH_2CH(CH_3)O]_{5-6}H$ were added and the reaction mixture is stirred at 80° C. for three hours more.

This gave a clear, colourless product.

Example 6

503 g of silyl polyether SP-2 were introduced, heated to 60° C. and admixed with 16 g of IPDI. Then 0.5 g of TIB KAT 722 was added. The mixture was stirred for 45 minutes. Thereafter 13.8 g of bis(2-ethylhexyl)amine were added and the reaction mixture is stirred at 80° C. for three hours more.

This gave a clear, colourless product.

Example 7

500 g of silyl polyether SP-1 were introduced, heated to 60° C. and admixed with 16 g of IPDI. Then 0.7 g of TIB KAT 722 was added. The mixture was stirred for 45 minutes. Thereafter 117 g of Jeffamin® M 2070 (polyetheramine from Huntsman) were added and the reaction mixture is stirred at 80° C. for three hours more.

This gave a clear, colourless product.

Example 8 (Comparative Example)

2555 g of silyl polyether SP-2 were introduced, heated to 65° C. and admixed with 36.2 g n-butyl isocyanate. Then 2.59 g of TIB KAT 722 was added. The mixture was stirred for 4 hours. This gave a clear, colourless product with a viscosity of 9-12 Pa*s.

2. Application Examples

Examples of Adhesive and Sealant Formulations 25.9 wt % of the alkoxylation product from the respective examples was intensively mixed with 18.1 wt % of diisoundecyl phthalate, 51.1 wt % of precipitated chalk (Socal® U2S2, Solvay), 0.5 wt % of titanium dioxide (Kronos® 2360, Kronos), 1.4 wt % of adhesion promoter (Dynasylan® AMMO, Evonik), 1.1 wt % of drying agent (Dynasylan® VTMO, Evonik), 1.5 wt % of an antioxidant/stabilizer mixture (ratio of Irganox® 1135 to Tinuvin® 1130 to Tinuvin® 292=1:2:2 ratio) and 0.4 wt % of the curing catalyst (TIB® KAT 223, TIB) in a mixer (Speedmixer® FVS 600, Hausschild). The completed formulation was transferred to PE cartridges, and was stored for at least 24 hours at room temperature prior to application. Given that the formulations of the alkoxylation products in the examples stated above were identical in all cases, the discussion of the results has been carried out with identification of the alkoxylation product utilized as the basis of the formulation.

Determination of Breaking Force and Elongation at Break in Accordance with DIN 53504:

The formulation was knife-coated in a film thickness of 2 mm on a PE surface. The films were stored for 7 days at 23° C. and 50% relative humidity. S2 dumbbell specimens were then punched from the films with the aid of a cutter and a toggle press.

For testing, the dumbbell specimens thus produced were clamped into a universal testing machine (Shimadzu), and determinations were made of the tensile strength and the elongation at break on extension of the specimens at constant rate (200 mm/min).

Determination of the Tensile Shear Strength of Overlap Bonds in Accordance with DIN EN 1465:

Overlap bonds were produced with the prepared formulation. For these bonds, two stainless steel substrates (V2A, 1.4301) were used. The region of the overlap bond amounted to 500 mm². The bonds were cured at 23° C. and 50% relative humidity. After 21 days, the bonds were clamped into a universal testing machine (Shimadzu), and a force was exerted on the bond at constant rate (10 mm/min) until the bond broke. The breaking force was ascertained.

Determination of the Through-Cure Rate:

A strand of adhesive or sealant is applied to a PE surface (height: 10 mm, width: 20 mm). After 24 hours of storage at 23° C. and 50% relative humidity, a section is cut from the strand, and the thickness of the cured layer is measured using a gauge.

TABLE 1

Characteristics of the formulation during and after curing:

| Polymer of example | S2 dumbbell specimen | | Adhesive bond | |
|---|---|---|---|---|
| | Breaking stress [N/mm²] | Elongation at break [%] | Tensile shear strength [N/mm²] | Through-cure after 24 h [mm] |
| 1 | 1.8 | 126 | 1.8 | 2.8 |
| 2 | 1.6 | 278 | 1.2 | 2.4 |
| 3 | 2.0 | 137 | 1.8 | 2.5 |
| 4 | 1.4 | 291 | 1.0 | 2.4 |
| 5 | 1.9 | 140 | 1.9 | 2.8 |
| 6 | 1.7 | 301 | 1.3 | 2.3 |
| 7 | 1.5 | 133 | 1.5 | 2.6 |
| 8 | 0.6 | 196 | 0.9 | not determined |

The performance properties of the compositions of the invention comprising the alkoxylation products of the invention, these properties being summarized in Table 1, can be used to demonstrate that the products exhibit sufficient depth curing of more than 2 cm after just 24 hours.

Relative to the prior art, furthermore, a significantly improved profile of the properties is recorded. Not only the breaking stress but also the elongation at break (based on DIN 53504) were significantly increased relative to the comparative example, by using compounds of the formula (I) with at least 10% of the radicals M as being formula Iva and/or IVb.

In adhesive bonding tests employing the compositions of the invention, furthermore, significantly higher tensile strength values were achieved than for the comparative compositions. The results therefore show that termination with amines leads to higher elongation capacities in combination with higher strengths.

Storage Stability:

Storage stability tests, moreover, in which the alkoxylation products of Examples 1 to 7 were compared with the alkoxylation product 8, showed that the storage stability of compositions comprising the corresponding alkoxylation products is improved significantly by using compounds of the formula (I) with at least 10 mol % of the radicals M, based on the total amount of the radicals M, as being formula IVa and/or IVb. Simply by using compounds of the formula (I) with at least 10 mol % of the radicals M, based on the total amount of the radicals M, being of formula (IVa) and/or (IVb), therefore, a significant improvement can be seen, and can be increased further by using compounds of the formula (I) with at least 25 mol % or 51 mol % of the radical M, based on the total amount of radicals M, being of formula (IVa) and/or (IVb) in each case.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. An alkoxylation product which comprises the structural elements of the formula (I)

$$M_i D_j T_k Q_l UR_u AP_v \quad \text{formula (I)}$$

wherein M, D, T and Q are linked not to one another but instead with one another via the groups UR and/or AP, and the groups UR and AP are not linked to one another, i=1 to 16,
j=0 to 10,
k=0 to 6,
l=0 to 4,
u=1 to 17,
v=0 to 6, M radicals independently of one another are identical or different radicals from the following group:

a) —NH—$R^{12}$     formula (IVa), b) —$NR^{12}_2$     formula (IVb), c) —$OR^{12}$     formula (IVc) and d)

formula (Ia)

$$\left(R^2\right)_f Si\left(O-R^3\right)_g$$
$$(H_2C)_h$$
$$R^1\left(O\right)_a\left(O\atop R^5\right)_b\left(O\right)_c\left(O\atop R^7\right)_e O-$$

(structural formula Ia with substituents $R^1$, $R^2$, $R^3$, $R^4$, $R^5$, $R^6$, $R^7$ and indices a, b, c, d, e, f, g, h)

where $R^1$=independently at each occurrence a saturated or unsaturated, linear or branched organic hydrocarbon radical which may contain O, S and/or N as heteroatoms, $R^2$=independently at each occurrence an alkyl group having 1 to 8 carbon atoms, $R^3$=independently at each occurrence an alkyl group having 1 to 8 carbon atoms, $R^4$=independently at each occurrence a hydrogen radical or an alkyl group having 1 to 8 carbon atoms, $R^5$=independently at each occurrence a hydrogen radical, an alkyl group having 1 to 20 carbon atoms, or an aryl or alkaryl group, or $R^4$ and one of the radicals $R^5$ may together form a ring which includes the atoms to which $R^4$ and $R^5$ are bonded, $R^6$ and $R^7$=independently at each occurrence the same as $R^5$ and/or alkoxy, $R^{11}$=independently at each occurrence a saturated or unsaturated alkyl group having 1 to 24 carbon atoms, whose chain may be interrupted by oxygen and may further carry functional groups;

a=0 to 1000,
b=0 to 1000,
c=0 to 1000,
d=0 to 1000, with the proviso that the groups having the indices a, b, c and d are freely permutable over the molecular chain, e=1 to 10,
g+f=3 and g is at least 1,
h=0 to 10, where the different monomer units both of the fragments having the indices a, b, c and d and of the polyoxyalkylene chain of the substituent $R^1$ may be constructed in blocks with one another or else may be subject to a statistical distribution and, moreover, are freely permutable with one another, with the proviso that at least 10 mol % of the radicals M, based on the total amount of the radicals M, conform to —NH—$R^{12}$ of the formula (IVa) and/or —$NR^{12}_2$ of the formula (IVb), where for the formulae (IVa), (IVb) and (IVc):

$R^{12}$ of the formulae (IVa), (IVb) and (IVc) are independently of one another identical or different, optionally substituted hydrocarbon radicals which are interrupted by heteroatoms or are optionally substituted hydrocarbon radicals having 1 to 30 C atoms, D is a polyether radical $-(D^A)_tD^X$ where t is 2,
T is a polyether radical $-(D^A)_tD^X$ where t is 3 and
Q is a polyether radical $-(D^A)_tD^X$ where t is 4,
where $D^X$ is a t-valent functional, saturated or unsaturated, linear or branched organic hydrocarbon radical which may contain O, S, Si and/or N as heteroatoms, and $D^A$ is a fragment of the formula (II)

formula (II)

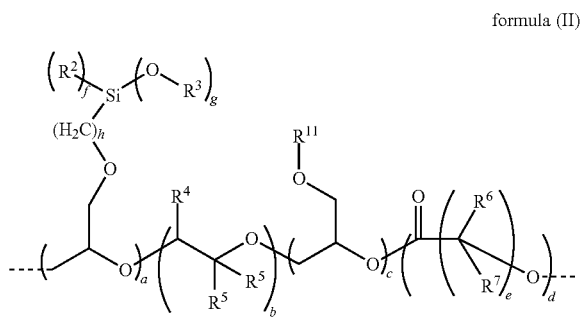

where a to h and $R^2$ to $R^7$ and $R^{11}$ are defined as in formula (Ia), and with the proviso that the sum total of all indices b of the formulae (Ia) and (II) makes at least 1, and the sum total of all indices a of the formulae (Ia) and (II) makes at least 1, UR is a divalent radical of the form $-U-D^C-U-$, where U is a $-C(O)-NH$ group which is bonded via the nitrogen to $D^C$, where $D^C$ is a divalent hydrocarbon radical, AP are independently of one another identical or different radicals of the general formula (IIIa) or (IIIb)

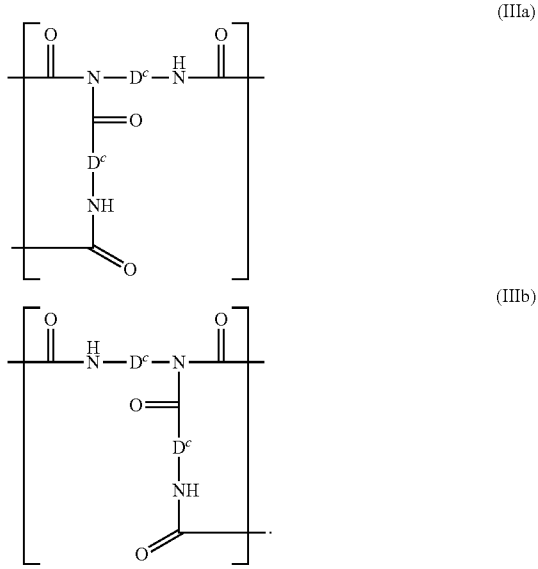

2. The alkoxylation products according to claim 1, wherein k and l are zero.

3. The alkoxylation products according to claim 1, wherein formula (Ia) a=0.

4. The alkoxylation products according to claim 1, wherein the sum total of all indices a from formula (Ia) and formula (II) makes at least 2, and/or the sum total of all indices b from formula (Ia) and formula (II) makes at least 3.

5. The alkoxylation products according to claim 1, wherein at least 25 mol % of the radicals M, based on the total amount of the radicals M, conform to $-NH-R^{12}$ of the formula (IVa) and/or $-NR^{12}_2$ of the formula (IVb).

6. A process for preparing alkoxylation products comprising reacting polyethers carrying OH groups, with polyfunctional isocyanates and with compounds of the formula $H-NH-R^{12}_2$ as per formula (IVa) and/or $H-NR^{12}_2$ as per formula (IVb).

7. The process according to claim 6, wherein the polyfunctional isocyanates are diisocyanates.

8. The process according to claim 6, wherein in the compounds of the formula $H-NH-R^{12}_2$ as per formula (IVa) and/or $H-NR^{12}_2$ as per formula (IVb), at least one compound is used which is selected from ethylamine, diethylamine, propylamine, dipropylamine, butylamine, dibutylamine, dicyclohexylamine, dihexylamine, 2-ethylhexylamine, di(2-ethylhexyl)amine, ditridecylamine, aniline, 1-phenylethylamine, 2,6-xylidene, 2-phenylethylamine, benzylamine, toluidine, 2-methoxyethylamine, 3-methoxypropylamine, di(2-methoxyethyl)amine, 2-(diethylamino)ethylamine, 3-(dimethylamino)-1-propylamine, bis[(3-dimethylamino)propyl]amine, N-(3-aminopropyl) imidazole and amino-functional polyethers.

9. The process according to claim 6, wherein in a first reaction step (a) polyethers of the formula $(HD^A)_tD^X$ are reacted with diisocyanates and in a second reaction step (b) the product of the first reaction step (a) is reacted with a molecule of the formula H-M, where $-(D^A)_tD^X$ and M are defined as in claim 1.

10. The process according to claim 6, wherein the diisocyanates are used in a molar excess relative to the polyethers $(HD^A)_tD^X$.

11. The process according to claim 6, further comprising adding at least one further component which is selected from catalysts, polyethers $(HD^A)_tD^X$, diisocyanates and/or molecules of the formula H-M after the first reaction step (a) and/or after the second reaction step (b).

12. A composition comprising the alkoxylation products according to claim 1.

13. The composition according to claim 12, further comprising at least one curing catalyst.

14. The composition according to claim 12, further comprising at least one adjuvant selected from the group of diluents, catalysts, plasticizers, fillers, solvents, emulsifiers, adhesion promoters, rheology additives, additives for chemical drying, and/or stabilizers against thermal and/or chemical exposures and/or exposures to ultraviolet and visible light, thixotropic agents, flame retardants, blowing agents or defoamers, deaerating agents, film-forming polymers, antimicrobial and preservative substances, antioxidants, dyes, colorants and pigments, frost preventatives, fungicides, reactive diluents, complexing agents, wetting agents, co-crosslinkers, spraying assistants, vitamins, growth substances, hormones, active pharmacological ingredients, fragrances, radical scavengers and/or other adjuvants.

15. A method of utilizing the alkoxylation products, as claimed in claim 1 for producing adhesives or sealants or coating materials, shaped articles, liquid pastes, powder coating curing agents, particles, fabrics or composite materials.

16. The method according to claim 15, for the sealing, bonding, foaming, or coating of porous or non-porous, particulate or sheetlike substrates selected from the group encompassing construction elements, components, metals and construction materials, iron, steel, stainless steel and cast iron, ceramic materials comprising solid metal oxides or non-metal oxides or carbides, aluminium oxide, magnesium oxide or calcium oxide, and also mineral substrates, organic substrates, composite materials, wood composites, cork, chipboard and fibreboard panels made from wood or cork, MDF panels, WPC articles, cork articles, laminated articles, ceramics, natural fibres, synthetic fibres and/or wood.

17. A composition comprising the alkoxylation products prepared according to the process of claim 6.

* * * * *